No. 794,191. PATENTED JULY 11, 1905.
O. SCHUTT.
GRAIN DRILL.
APPLICATION FILED APR. 5, 1905.
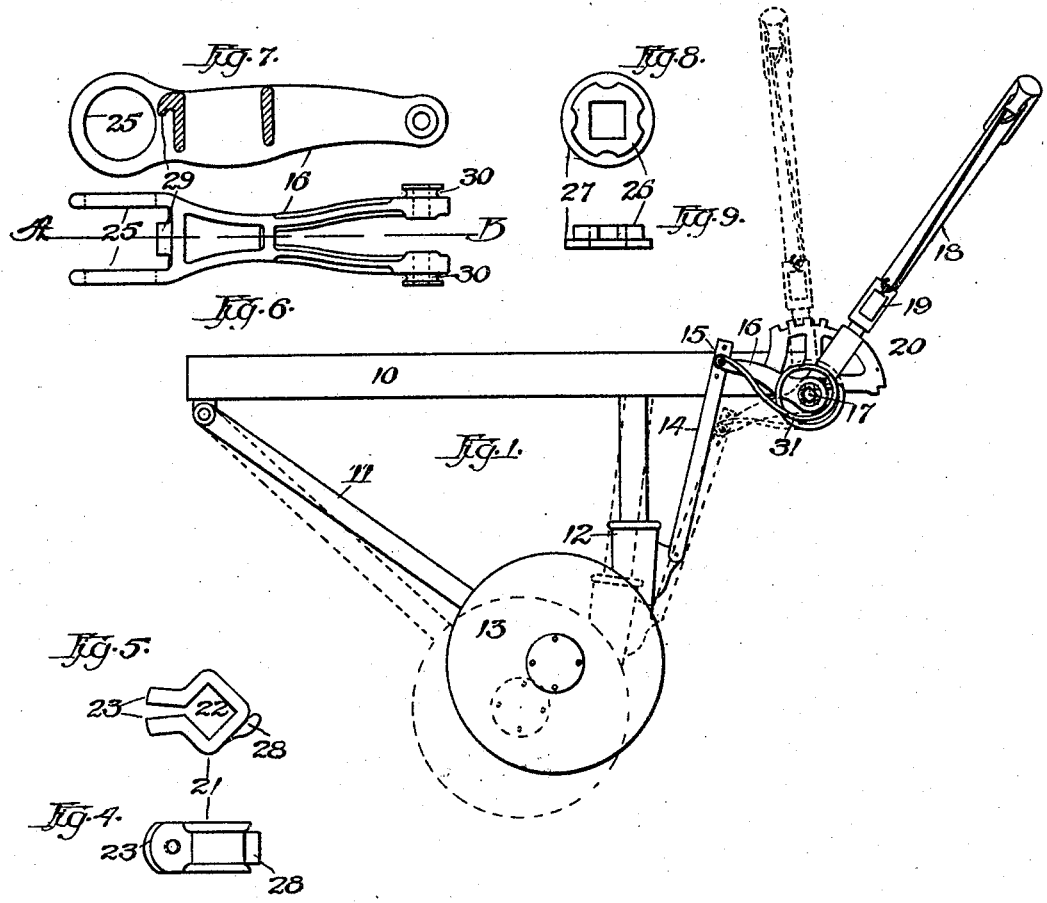
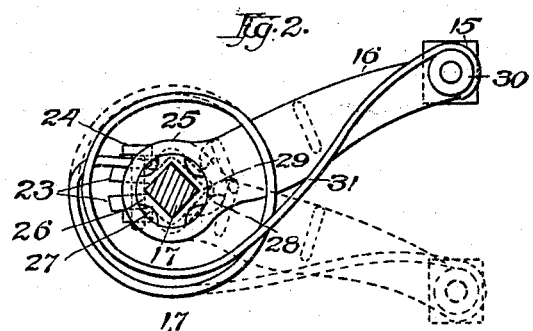
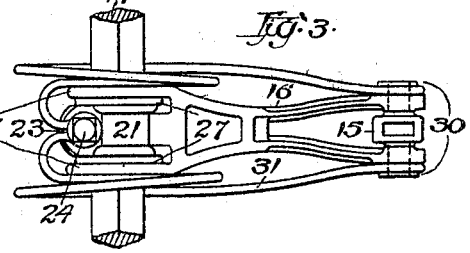
Witnesses:
F. W. Hoffmeister
T. J. Alfreds
Inventor:
Owen Schutt
By E. W. Burgess
Attorney.

No. 794,191.

Patented July 11, 1905.

UNITED STATES PATENT OFFICE.

OWEN SCHUTT, OF HAMILTON, CANADA, ASSIGNOR TO INTERNATIONAL HARVESTER COMPANY, A CORPORATION OF NEW JERSEY.

GRAIN-DRILL.

SPECIFICATION forming part of Letters Patent No. 794,191, dated July 11, 1905.

Application filed April 5, 1905. Serial No. 253,916.

*To all whom it may concern:*

Be it known that I, OWEN SCHUTT, a citizen of the United States, residing at Hamilton, in the county of Wentworth and Province of Ontario, Dominion of Canada, have invented certain new and useful Improvements in Grain-Drills, of which the following is a specification, reference being had to the accompanying drawings, forming a part thereof.

My invention relates to improvements in grain-drills.

It consists in providing the machine with an adjustable rock-shaft having an arm for each hoe and a flexible spring mechanism connecting each arm to the respective hoes, whereby the hoes are yieldingly pressed into the soil or positively lifted above its surface when the rock-shaft is turned in its bearings, its object being to provide flexible mechanism that will allow a wider range of adjustment of the hoes without materially altering the pressure of the flexible spring mechanism and to provide improved connecting parts between the arms and rock-shaft, whereby a free and well-balanced movement of the parts relative to each other is secured. I attain these objects by the mechanism illustrated in the accompanying drawings, in which—

Figure 1 is a side elevation of a part of a grain-drill embodying my invention. Fig. 2 is a side view of one of the flexible arms and attached spring, the rock-shaft being shown in section. Fig. 3 is a top plan view of Fig. 2. Fig. 4 is a top plan view of a clamp-piece designed to be secured to the rock-shaft. Fig. 5 is an end elevation of Fig. 4. Fig. 6 is a plan view of a lifting-arm. Fig. 7 is a side view of Fig. 6 on line A B. Fig. 8 is a detail of one of the connecting parts, and Fig. 9 is a side view of Fig. 8.

Similar numerals refer to similar parts throughout the several views.

10 represents part of the frame of a grain-drill.

11 is one of the drag-bars, which is pivotally connected at its forward end with the frame 10 and is connected with the hoe or disk support 12 at its rear end.

13 is the furrow-opening disk; 14, a link pivotally connected at its lower end to the disk-support and adapted to slide through a bearing-block 15, pivoted between the sides of a forked pressure-arm 16 and limited in its movement by pins inserted in any of the various holes at its upper end in a well-known way.

17 is a square rock-shaft suitably mounted on the frame and adapted to rock in its bearings. Attached thereto is a hand-lever 18, having a common form of sliding detent 19, adapted to engage with a toothed sector 20 for the purpose of holding the lever in any desired adjustment in a well-known manner.

21 is a block portion having an angular central opening 22, adapted to receive the square shaft 17, and an opening outward communicating with the central opening, forming what may be called a "split clamping-piece," having ear portions 23, adapted to receive a bolt 24 for the purpose of securing it to the shaft.

The forked pressure-arm 16 is provided at its rear end with rearwardly-extending ears 25, having central openings adapted to receive the boss portions 26 of the washers 27, having central openings adapted to receive the square shaft 17. The block 21 is designed to be received between the washers 27, and the assembled parts are then placed upon the shaft. For the purpose of limiting the free movement of the pressure-arm relative to the block the latter is provided with a hook portion 28, with which a lip 29, forming part of the pressure-arm 16, engages, as shown by dotted lines in Fig. 2. The forward forked portion of the pressure-arm 16 is adapted to embrace the block 15 and receive its oppositely-disposed trunnions therein, as shown in Fig. 3. It is also provided with laterally-projecting bosses 30, having grooved peripheries adapted to receive the hooked ends of the double volute spring 31, having open coils surrounding the rock-shaft outside the arm and provided with an inwardly-projecting eye adapted to receive the clamping-bolt 24. The spring, as shown, is preferably made of a continuous piece of wire; but it would be equally effective if made of two pieces and each one provided with an eye to receive the bolt. As constructed the spring has a long range of movement without materially changing its degree of force, and by making it with the double volute coils much lighter material may be used and more resiliency secured with less liability of breaking.

What I claim as my invention, and desire to secure by Letters Patent, is—

1. In a machine of the class described, the combination of furrow-openers suitably supported in a manner permitting them to be raised and lowered, a rock-shaft suitably mounted above said furrow-openers, and means for rocking said shaft, arms mounted on said shaft in a manner permitting a limited rocking movement relative to the axis thereof, links pivotally connected with the furrow-openers and outer ends of said arms, pressure-springs, each formed of a single piece of wire having its opposite ends connected with the outer ends of the arms upon opposite sides thereof and having volute coils encircling the rock-shaft upon opposite sides of the arms, and a central eye portion and means for securing said eye portion to said rock-shaft.

2. In a machine of the class described, the combination of furrow-openers suitably supported in a manner permitting them to be raised and lowered, a rock-shaft suitably mounted above said furrow-openers, and means for rocking said shaft, blocks clamped to said shaft, arms mounted upon said shaft and having bearings thereon upon opposite sides of said blocks and engaging therewith in a manner to have a limited rocking movement about the axis of said shaft, links pivotally connected with the furrow-openers and outer ends of said arms, pressure-springs, each formed of a single piece of wire having its opposite ends connected with the outer ends of the arms upon opposite sides thereof and having volute coils encircling the rock-shaft upon opposite sides of said arms, and a central eye portion and means for securing said eye portion to said block that is clamped to the shaft.

3. In a machine of the class described, the combination of furrow-openers suitably supported in a manner permitting them to be raised and lowered, an angular rock-shaft suitably mounted above said furrow-openers, and means for rocking said shaft, blocks clamped to said shaft, washers provided with angular openings adapted to receive said angular rock-shaft and having circular boss portions on one side, said washers being placed upon opposite sides of said blocks, levers mounted on the circular bosses and adapted to have a limited movement thereabout, links connecting the forward ends of said levers with said furrow-openers, pressure-springs connected at their forward ends with the forward ends of said levers, upon opposite sides thereof, and having volute coils encircling the rock-shaft upon opposite sides of said levers, and eye portions, secured to said blocks, that are clamped to said rock-shaft.

4. In a machine of the class described, the combination of furrow-openers suitably supported in a manner permitting them to be raised and lowered, an angular rock-shaft suitably mounted above said furrow-openers, and means for rocking said shaft, pressure-arms mounted on said rock-shaft and connected with said furrow-openers by means of links, said pressure-arms comprising rearwardly-extending ear portions having circular axial openings therethrough and forked forward ends adapted to receive said links, washers having axial angular openings adapted to embrace said rock-shaft, and circular boss portions adapted to enter the axial openings in said ear portions, blocks having angular openings adapted to receive said shaft, means for securing said blocks to said shaft between said washers, and projections on said blocks adapted to contact with said pressure-arms to limit their movement in one direction.

5. In a machine of the class described, the combination of furrow-openers suitably supported in a manner permitting them to be raised and lowered, an angular rock-shaft suitably mounted above said furrow-openers, and means for rocking said shaft, pressure-arms mounted on said rock-shaft and connected with said furrow-openers by means of links, said pressure-arms comprising rearwardly-extending ear portions having circular axial openings therethrough and forked forward ends adapted to receive said links, washers having axial angular openings adapted to embrace said rock-shaft and circular boss portions adapted to enter the axial openings in said ear portions, blocks having angular openings adapted to receive said shaft and rearwardly-extending ear portions, with an opening between them communicating with said angular openings, and a bolt engaging with said ear portions in a manner to secure said blocks to said shaft between said washers, projections on said blocks adapted to contact with said pressure-arms to limit their movement in one direction, and pressure-springs, each formed of a single piece of wire having its opposite ends connected with the outer ends of said arms, upon opposite sides thereof and having volute coils encircling the rock-shaft upon opposite sides of said arms, and a central eye portion engaging with said securing-bolt.

In witness whereof I hereto affix my signature in presence of two witnesses.

OWEN SCHUTT.

Witnesses:
 RICHARD BUTLER,
 A. L. JOHNSON.